(12) United States Patent
Eberlein

(10) Patent No.: US 11,368,547 B2
(45) Date of Patent: Jun. 21, 2022

(54) COMPONENT ZONES IN A CLOUD PLATFORM

(71) Applicant: SAP SE, Walldorf (DE)

(72) Inventor: Peter Eberlein, Malsch (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/600,186

(22) Filed: Oct. 11, 2019

(65) Prior Publication Data

US 2021/0112138 A1 Apr. 15, 2021

(51) Int. Cl.
*H04L 67/306* (2022.01)
*H04L 67/1097* (2022.01)
*G06F 16/16* (2019.01)
*G06F 11/30* (2006.01)
*G06F 16/11* (2019.01)
*H04L 9/40* (2022.01)

(52) U.S. Cl.
CPC ........ *H04L 67/306* (2013.01); *G06F 11/3006* (2013.01); *G06F 16/119* (2019.01); *G06F 16/162* (2019.01); *H04L 63/102* (2013.01); *H04L 63/20* (2013.01); *H04L 67/1097* (2013.01)

(58) Field of Classification Search
CPC ... H04L 67/306; H04L 63/102; G06F 16/162; G06F 16/119; G06F 11/3006
See application file for complete search history.

(56) References Cited

U.S. PATENT DOCUMENTS

| | | | | |
|---|---|---|---|---|
| 9,594,922 | B1* | 3/2017 | McGuire | H04L 9/0891 |
| 9,781,122 | B1* | 10/2017 | Wilson | H04L 63/08 |
| 10,218,703 | B2* | 2/2019 | Beiter | G06F 9/468 |
| 2003/0093533 | A1* | 5/2003 | Ezerzer | H04M 3/523 709/227 |
| 2007/0233851 | A1* | 10/2007 | Ma | H04L 67/1027 709/224 |
| 2012/0191667 | A1* | 7/2012 | Kopylovitz | G06F 3/0641 707/692 |
| 2012/0265976 | A1* | 10/2012 | Spiers | G06F 9/45533 713/2 |
| 2013/0291121 | A1* | 10/2013 | Iovanov | G06F 9/541 726/28 |
| 2016/0063060 | A1* | 3/2016 | Nguyen | G06F 16/2455 707/770 |

(Continued)

*Primary Examiner* — William G Trost, IV
*Assistant Examiner* — Monishwar Mohan
(74) *Attorney, Agent, or Firm* — Schwegman Lundberg & Woessner, P.A.

(57) ABSTRACT

Various examples are directed to cloud platform systems that implement a plurality of cloud components. A first cloud component may receive a zone token. The zone token may comprise a first user identifier indicating a first user and a first zone identifier (ID) indicating a first zone. The first cloud component may receive from a user computing system associated with the zone token a task request indicating a first task. The first cloud component may execute the first task. Executing the first task may include determining a first data unit at the first cloud component associated with the first zone ID, accessing the first data unit, and sending a request message to a second cloud component, the request message comprising the first zone ID, wherein the second cloud component comprises at least one second data unit associated with the first zone ID.

20 Claims, 12 Drawing Sheets

(56) References Cited

U.S. PATENT DOCUMENTS

| | | | | |
|---|---|---|---|---|
| 2017/0223026 A1* | 8/2017 | Amiri | .................. | H04L 67/02 |
| 2017/0364694 A1* | 12/2017 | Jacob | ................ | G06F 16/24534 |
| 2018/0025049 A1* | 1/2018 | Zeng | .................. | G06F 16/2365 |
| | | | | 707/703 |
| 2019/0251180 A1* | 8/2019 | Lachambre | ........... | G06F 16/258 |
| 2019/0340251 A1* | 11/2019 | Peddada | ............... | G06F 16/214 |
| 2020/0136825 A1* | 4/2020 | Gupta | .................. | H04L 9/3213 |

\* cited by examiner

US 11,368,547 B2

COMPONENT ZONES IN A CLOUD PLATFORM

TECHNICAL FIELD

This document generally relates to methods and systems for use with computing systems. More particularly, this document relates to ways persisting data and managing components in a cloud platform computing system.

BACKGROUND

Cloud platform computing systems, often referred to as cloud platforms or Platform-as-a-Service (PaaS), provide users with access to computing system functionality with reduced need for the user to maintain physical computer infrastructure. Instead, the cloud platform includes physical infrastructure that is used to provide computing services to the user. The user accesses the cloud platform via a network. Applications (Software-as-a-Service or SaaS) and/or other computing services are provided to the user via the network.

BRIEF DESCRIPTION OF DRAWINGS

The present disclosure is illustrated by way of example and not limitation in the following figures.

DETAILED DESCRIPTION

Figure 1:
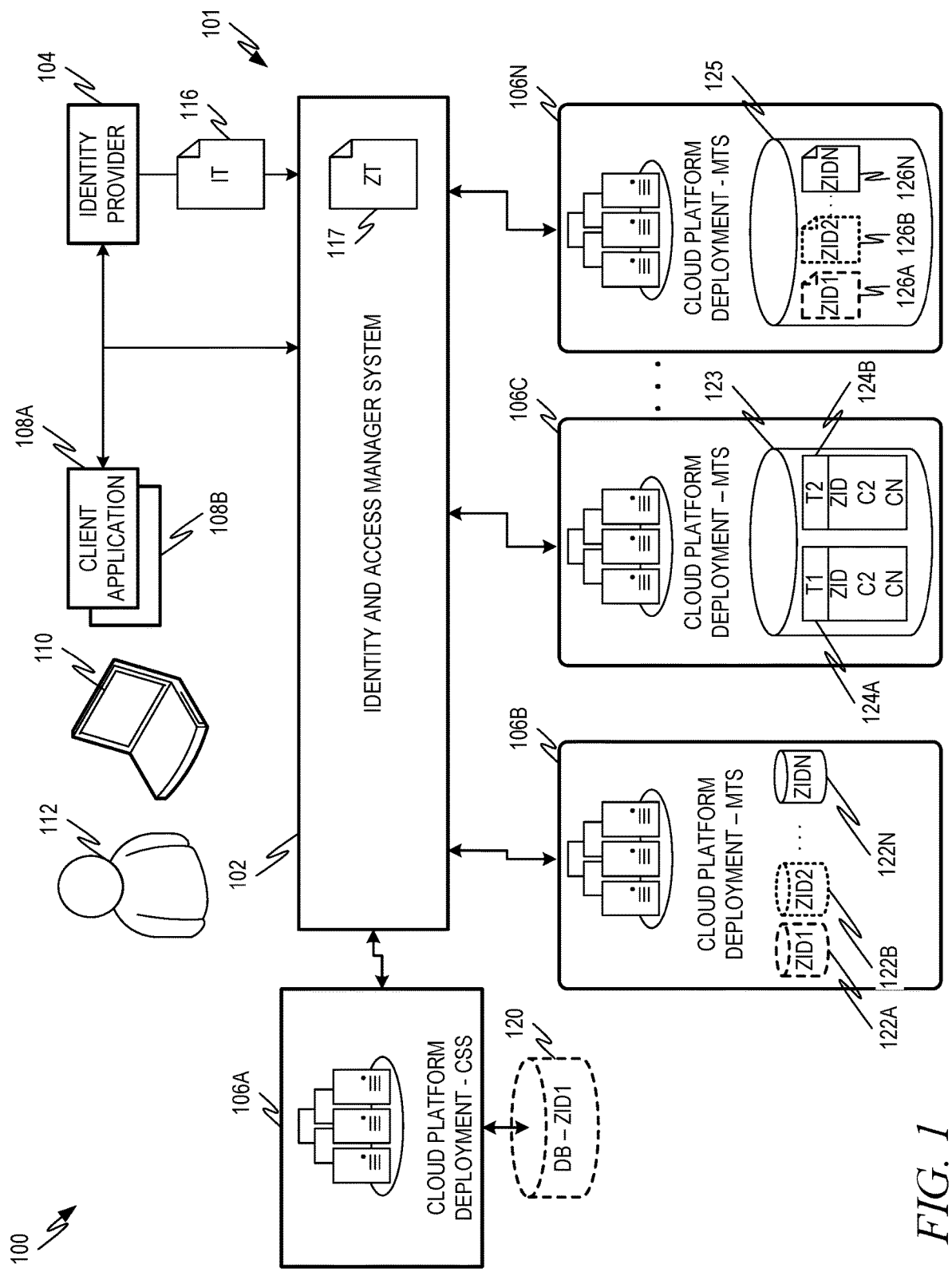
FIG. 1 is a diagram showing one example of an architecture including a cloud platform and showing an example implementation of cloud platform zones.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

A cloud platform provides computing services to multiple customers over multiple geographic areas. The customers of a cloud platform can include enterprises, such as corporations, government agencies, non-profits, or other similar organizations. Each customer has a set of associated users who access computing services from the cloud platform. The users associated with a customer may include employees of the customer, contractors of the customer, and/or other users having suitable relationships with the customer. In some examples, users associated with a customer can include that customer's own customers.

The cloud platform can provide computing services to customers in the form of solutions and services. A solution is a software program or set of related software programs provided as a single package to perform a solution task. Solution tasks can include, for example, enterprise applications such as human resources management (HRM) applications, accounting applications, project management applications, customer relationship management (CRM) applications, word processing applications, spreadsheet applications, accounting applications, software development applications, etc. Solutions can be provided directly to users, where the users are associated with cloud platform customers. For example, a user of a cloud platform may be an employee or similar associate of a customer. In some examples, a cloud platform customer utilizes the cloud platform to provide solutions to its own customers.

A service is a component of a software program that performs some or all of the functionality of one or several software programs. For example, a service may be called by a solution or other software component in the cloud platform. In other examples, a service runs in a supervisory capacity to monitor communications and/or workflow from multiple solutions. One example service is an audit log service that performs an audit function for a defined set of persisted data. Other example services include a one-inbox service that consolidates work items from multiple solutions, a key management service that stores cryptographic keys used for encryption, and a business process intelligence service that collects process status changes across solutions. Services can operate on a single solution or across multiple solutions. For example, a service may operate in response to a call from a given solution. In some examples, a service, such as an audit log service, may operate on data persisted by more than one solution. For example, the audit log service may receive audit log entries, such as "logon failed" or "password changed," from several different services and store in a common audit log. The audit log may provide a full picture of what is going on across multiple solutions. Collectively, services and solutions are referred to herein as cloud platform components. For example, cloud platform components include services and solutions including both multi-tenant solutions and customer system solutions.

The cloud platform implements services and solutions across a number of cloud platform deployments that can be geographically distributed across multiple data centers in different geographic regions. A cloud platform deployment is an instance of code executing at one or more servers, usually at a common data center or across data centers in a common geographic region (with low network latency between the data centers within one region). Consider an example in which a cloud platform is implemented for North America. The cloud platform may include a first cloud platform deployment executing at one or more servers in the United States, a second cloud platform deployment executing at one or more servers in Mexico, and third cloud platform deployment executing at one or more servers in Canada. Other geographic distributions are also contemplated, however.

Solutions and services can be executed as customer system solutions or as multi-tenant solutions. In a customer system solution, a solution is implemented by a single cloud platform deployment that is dedicated to one customer. For example, the cloud platform deployment implementing a customer system solution may execute at a server or servers dedicated to the customer. In another example, the cloud platform deployment implementing a customer system solution may execute at a virtual machine (VM) that is dedicated to one customer.

A multi-tenant solution, also sometimes referred to as an SaaS solution, a single cloud platform deployment provides a solution to multiple tenants. Tenants, described in more detail herein, can be associated with different customers and/or with different groups of users of a common customer. A multi-tenant solution segregates persisted data between different tenants. For example, data persisted through the solution for one tenant may not be accessible to other tenants. In some examples, a single customer has more than one tenant at a given multi-tenant solution. For example, a customer may desire to utilize a solution in a production environment and in one or more test or development environments. Accordingly, the customer may have a production tenant and one or more test tenants or development tenants, for example, at a single multi-tenant solution. The test and development tenants are used, for example, to test and/or develop new data or software. Services may similarly support different tenants and segregate data among tenants.

A multi-tenant solution segregates data between tenants in various different ways. In some examples, the cloud platform deployment implementing a multi-tenant solution implements dedicated databases for different tenants. Queries to read and/or write data during execution of the solution or service are directed to the database associated with the requesting tenant. In other examples, a cloud platform deployment implementing a multi-tenant solution implements dedicated database schemas for different tenants. Queries to read and/or a write data during execution of the solution or service are directed to the database schema associated with the requesting tenant. In other examples, a cloud platform deployment persists data for multiple tenants is persisted at a common database schema, but data records are marked to indicate their corresponding tenant. For example, data records may include a tenant column indicating the tenant from which the data record was persisted. Read queries during execution of applications for the tenant are modified to include a filter based on the tenant column to return only data persisted for the tenant.

In some examples, a customer is permitted to select the cloud platform deployment for hosting a given tenant. The customer may make its selection of a particular cloud platform deployment for various reasons. For example, a customer may select a cloud platform deployment at a geographic region or area that is close to the tenant and/or the users who will be using a given tenant. This may reduce network latency experienced by the tenant's users. In some examples, a customer selects a cloud platform deployment for tenant based on regulatory reasons. For example, some jurisdictions may have particular rules governing the storage of data, such as personal customer data. Regulatory rules may govern, for example, how data is stored, where data is stored, where data is stored first, etc. A customer may select a cloud platform deployment in a jurisdiction specified by the relevant regulatory scheme and/or a cloud platform deployment that manages data according to the rules established by the relevant regulatory scheme.

In various examples, it is desirable for a customer's use of a cloud platform to utilize multiple solutions and/or services. Accordingly, it is sometimes desirable to persist data in a cloud environment in a way that is accessible across multiple different tenants implemented across different solutions and/or across customer system solutions. One way to accomplish this is to establish point-to-point mappings between tenants and/or customer system solutions. For example, a management system may establish mappings that tie a first tenant at a first multi-tenant solution to a second tenant at a second multi-tenant solution and a third tenant at a service. Direct point-to-point mappings, however, can be complex and do not scale well. For example, mapping a new tenant to an existing tenant may also require mapping the new tenant to all of the other tenants that are mapped to the existing tenant. For solutions using shared services, this may mean that when a customer subscribes to a solution, not only the tenant of this solution is mapped, but all tenants of the shared services may be mapped to the solution.

Various examples described herein address these and other problems by utilizing cloud platform zone. A cloud platform zone, or zone, is a set of tenants and/or customer system solutions that share access to data persistence. For example, a tenant at a first multi-tenant solution may access data persisted by cloud platform deployments for other tenants and customer system solutions that are part of the same zone.

In various examples, zones in a cloud platform are uniquely identified by a zone identifier (ID). The zone ID is associated with data persistence that is part of the zone. When a tenant of a multi-tenant solution is part of a zone, data persistence for the tenant at the cloud platform deployment implementing the tenant is marked with the appropriate zone ID. For example, when the data persistence for the tenant is a dedicated database or database schema, the dedicated database or database schema can be associated with the zone ID. In examples where the data persistence for the tenant is marked by a tenant column in one or more database tables, the zone ID can be mapped to the tenant id included in the tenant column or, in some examples, a new zone column can be added to the database tables to include the zone ID.

When a user logs-on to a solution or service, (e.g., a multi-tenant solution or customer system solution), an identity and access management (IAM) system issues a token indicating the identity of the user and the zone to which the user is logged-on. For example, the token may include the zone ID for the zone. When a multi-tenant solution is accessed, the multi-tenant solution maps the zone ID to the appropriate tenant and provides the user with access to the data persistence associated with that tenant. The solution may also use the zone ID to call another solution or service. For example, the solution may provide a request to another solution or service where the request includes the zone ID, either by forwarding the original token that includes the zone ID, using a new token with the same zone ID or passing the zone ID by some other means. The receiving solution and/or service utilizes the zone ID to respond to the request using the persistence at the receiving solution or service that is associated with a tenant that is part of the zone indicated by the zone ID.

FIG. 1 is a diagram showing one example of an environment 100 including a cloud platform 101 and showing an example implementation of cloud platform zones. The environment 100 includes the cloud platform 101, an identity provider system 104 and a user computing device 110 that executes one or more client applications 108A, 108B for the user 112.

The cloud platform 101 includes multiple cloud platform deployments 106A, 106B, 106C, 106N. Although four cloud platform deployments 106A, 106B, 106C, and 106N are shown, the cloud platform 101 may include more or fewer cloud platform deployments, for example, depending on the implementation. Each cloud platform deployment 106A, 106B, 106C, 106N implements a solution for one or more customers. In the example of FIG. 1, the cloud platform deployment 106A implements a customer system solution and cloud platform deployments 106B, 106C, 106N implement multi-tenant solutions and/or services. In practice, a cloud platform 101 can include any suitable mix of cloud platform deployments for multi-tenant solutions, multi-tenant services, and customer system solutions.

As set forth above, the example cloud platform deployment 106A implements a customer system solution. The cloud platform deployment 106A may be executed on a server or system of servers that are dedicated to a given customer. A database 120 persists data for the cloud platform deployment 106A. For example, the user 112 may access the cloud platform deployment 106A and its database 120 only if the user 112 is associated with cloud platform customer for which the cloud platform deployment 106A is implemented.

Cloud platform deployments 106B, 106C, 106N, which implement multi-tenant solutions and/or services, are not customer-specific and segregate persisted data for multiple different tenants. In the example of FIG. 1, the cloud platform deployment 106B implements separate database 122A, 122B, 122N for different tenants. The cloud platform deployment 106C implements a database 123 that includes various example tables 124A, 124B. Although two example tables 124A, 124B are shown, the database 123 may include additional tables that are not shown in FIG. 1 for clarity. Each of the tables 124A, 124B includes a column that indicates a zone ID. The zone ID column in a given table 124A, 124B may include a zone ID. Accordingly, records in the tables 124A, 124B include a record field that includes the zone ID corresponding to that record. The cloud platform deployment 106N includes a database 125 that comprises different schemas 126A, 126B, 126N. Each schema 126A, 126B, 126N is associated with a particular tenant. Further, each schema 126A, 126B, 126N is associated with a zone ID indicating the zone to which the corresponding tenant belongs.

The cloud platform deployments 106A, 106B, 106C, 106N may be implemented in different geographic regions. For example, a first cloud platform deployment 106A may be implemented by one or more servers at one or more data centers in North America; a second cloud platform deployment 106B may be implemented by one or more servers at one or more data centers in east Asia, a third cloud platform deployment 106N may be implemented by one or more servers at one or more data centers in Europe, and so on. In some examples, more than one cloud platform deployment 106A, 106B, 106C, 106N is implemented in the same geographic region.

The user 112 is associated with a customer of the cloud platform 101. For example, the user 112 may be an employee of a customer, and/or a customer of the cloud platform customer. The user computing device 110 may be any suitable computing device including, for example, a mobile telephone, a tablet computing device, a laptop computing device, a desktop computing device, etc. In some examples, the user 112 is a human user. In FIG. 1, the example client applications 108A, 108B is operated by a human user 112. In some examples, the user is non-human (e.g., a software or hardware component). For example, the client applications 108A, 108B may have a user account with an identity provider system 104 and/or identity and access management system 102 that does not require human intervention to use. Accordingly, client applications 108A, 108B, in some examples, does not include the user 112 and/or operate independent of the user 112.

To access the cloud platform 101, the user 112 (e.g., via a client application 108A, 108B) authenticates to the identity provider system 104. The user 112 may authenticate with the identity provider system 104 either before receiving access to the cloud platform 101. In some examples, the user 112 first requests a logon from the identity and access management system 102. In these examples, the identity and access management system 102 directs the user 112 to the identity provider system 104 for authentication. In other examples, the user 112 initially authenticates with the identity provider system 104 and then requests logon at the identity and access management system 102.

The identity provider system 104 authenticates the user 112 using any suitable method. In some examples, the identity provider system 104 authenticates the user using single factor authentication, such as, for example, a user name and password. In other examples, the identity provider system 104 authenticates the user 112 using two-factor authentication or any other suitable technique. When the user 112 is authenticated by the identity provider system 104, the identity provider system 104 provides an identity token 116 to the identity and access management system 102. The identity token 116 indicates the identity of the user 112.

The identity token 116 can be in any suitable format. In some examples, the identity provider system 104 generates the identity token 116 according to the Security Assertion Markup Language (SAML). In some examples, the identity token 116 is cryptographically signed by the identity provider system 104. The identity token 116, in some examples, is cryptographically signed using a private cryptographic key of the identity provider system 104. Accordingly, the identity and access management system 102 may verify the identity token 116 using a public key known to be associated with the identity provider system 104.

In some examples, the identity token 116 also indicates a customer-defined user group to which the user belongs. For example, the identity provider system 104 may include user/group data that ties users 112 to particular groups. The user/group data may be provided by and/or based on data provided by a customer associated with the user 112. The group to which a user is assigned may be used by the cloud platform 101 to manage permissions at the various cloud platform deployments 106A, 106B, 106C, 106N. For example, groups may be associated with roles, role collections, and scopes, for example, at the identity and access management system. A role describes a function or responsibility of a user that is associated with one or more scopes. For example, a role platform developer may include a scope that permits the developer to have read access to a zone called Project X. According, the role platform developer may include a scope zone.read for the zone Project X. The role platform developer, in some examples, includes other scopes for other zones and/or the same zone. For example, the role platform developer may also include a scope zone-.write for the zone Project X. A role collection is a collection of roles that includes multiple roles. For example, a role collection developer may include the role platform developer as well as other roles (e.g., user interface developer, database developer, development project manager, etc.).

The identity token 116 is provided to the identity and access management system 102. The identity and access management system 102 generates a zone token 117 for the user 112. The zone token 117 may be in any suitable format including, for example, the SAML or OpenID Connect format. The zone token 117 indicates an identity of the user and a zone to which the user has logged-in. The identity of the user 112 may be described in the zone token 117 in any suitable manner. In some examples, the identity of the user 112 is described by role or role collection that is associated with the user's 112 unique identity and/or the identity of the group indicated by the identity token 116. The zone may be indicated at the zone token 117, for example, by a zone ID corresponding to the zone. In some examples, the user 112 indicates to the identity and access management system 102 and/or the identity provider system 104 the zone to which the user would like to log-on. In other examples, the identity and access management system 102 and/or the identity provider system 104 determine a zone or zones to which the user 112 is authorized to log-on.

In some examples, the zone token 117 indicates a scope or scopes granted to the user 112 at the zone. For example, the identity and access management system 102 may correlate the identity of the user 112 to a scope or scopes at the requested zone. In some examples, the identity of the user is indicated by a group described by the identity token 116 as described herein. The identity and access management system 102 may identify a scope or scopes granted to the user 112, for example, by determining an association between the group and a role or role collection. Each role or role collection may have one or more scopes at the requested zone associated therewith.

The identity and access management system 102 provides the zone token 117 to one or more cloud platform deployments 106A, 106B, 106C, 106N that the user 112 accesses. The cloud platform deployment 106A, 106B, 106C, 106N, upon receiving the zone token 117, maps the zone ID indicated by the zone token 117 to one or more tenants at the solution or service implemented at the cloud platform deployment 106A, 106B, 106C, 106N.

In the example of FIG. 1, the cloud platform deployments show data persistence associated with different zone IDs. For example, the cloud platform deployment 106A that includes a customer system solution also comprises the database 120. In this example, the database 120 is associated with the zone ID of a first zone, indicated by ZID1. The cloud platform deployment 106B includes separate databases 122A, 122B, 122N for different tenants. In this example, the database 122A is associated with the zone ID ZID1 while the databases 122B, 122N are associated with other zone IDs (ZID2, ZIDN). The cloud platform deployment 106C includes a database 123 including tables 124A, 124B including zone ID columns, as described herein. The cloud platform deployment 106N includes the database 125 with different schemas, where the schema 126A is associated with zone ID ZID1 while the schemas 126B and 126N are associated with zone IDs ZID2 and ZIDN.

Figure 2:
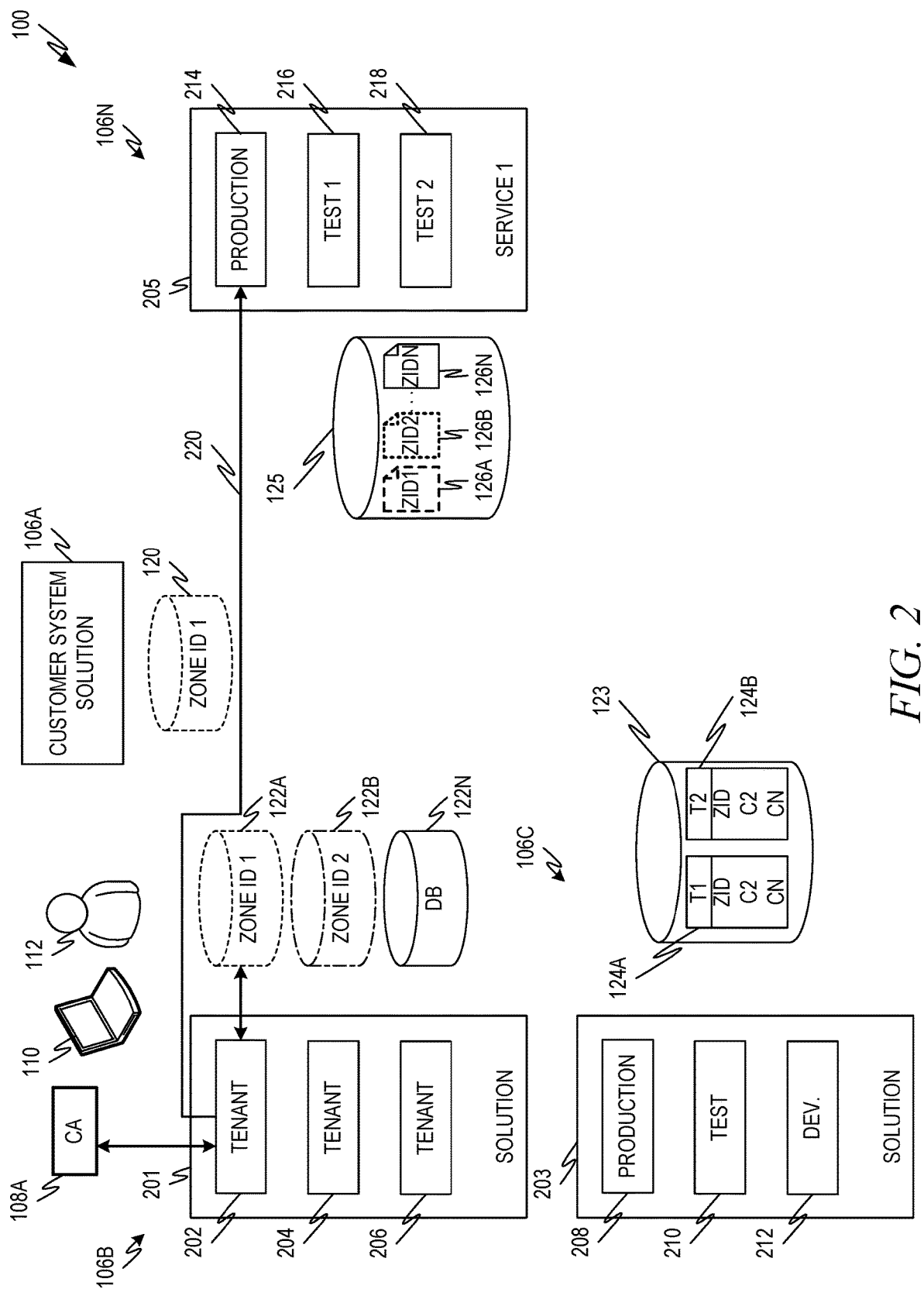
FIG. 2 is a diagram showing another example arrangement of the architecture of FIG. 1.

FIG. 2 is a diagram showing another example arrangement of the environment 100 of FIG. 1. In this example, the cloud platform deployment 106B implements a multi-tenant solution including a tenant 202 associated with the database 122A, a tenant 204 associated with the database 122B and a tenant 206 associated with the database 122N. The cloud platform deployment 106C implements a multi-tenant solution 203 including a tenant 208, labeled "production," a tenant 210 labeled "test," and a tenant 212. The various tenants 208, 210, 212 are associated with zones that are indicated at the respective zone columns of the tables 124A, 124B, as described herein. In the example cloud platform deployment 106N implements a service 205 that includes tenants 214, 216, and 218. The tenant 214, labeled "production" is associated with the schema 126A. The tenant 216, labeled "test 1," is associated with the schema 126B. The tenant 218 is associated with the schema 126N.

FIG. 2 also shows the user 112 accessing the multi-tenant solution 201 implemented at the cloud platform deployment 106B. The user accesses the solution 201 through the user computing device 110 and client application 108A. The solution 201 is provided by the zone token 117 associated with the user 112. For example, the identity and access management system 102 may have provided the zone token 117 to the solution 201 at or near the time that the user logged-in to the cloud platform 101. The solution 201 determines that the zone token 117 is correlated to the tenant 202. Accordingly, the solution 201 provides the user 112 with access to the data units persisted at the database 122A corresponding to the tenant 202.

In FIG. 2, the solution 201 calls the service 205. For example, the solution 201 may send a request 220 to that the service 205 perform a function associated with providing the functionality of the solution 201 to the user 112. The request 220 to the service 205 may include the zone ID associated with the user's zone. In other examples, the request 220 may include the zone token 117 for the user 112. The service 205 receives the request 220 and determines that the provided zone ID relates to the tenant 214. Accordingly, the service 205 responds to the request 220 utilizing the data persistence of the schema 126A that is associated with the same zone as the tenant 202.

Figure 3:
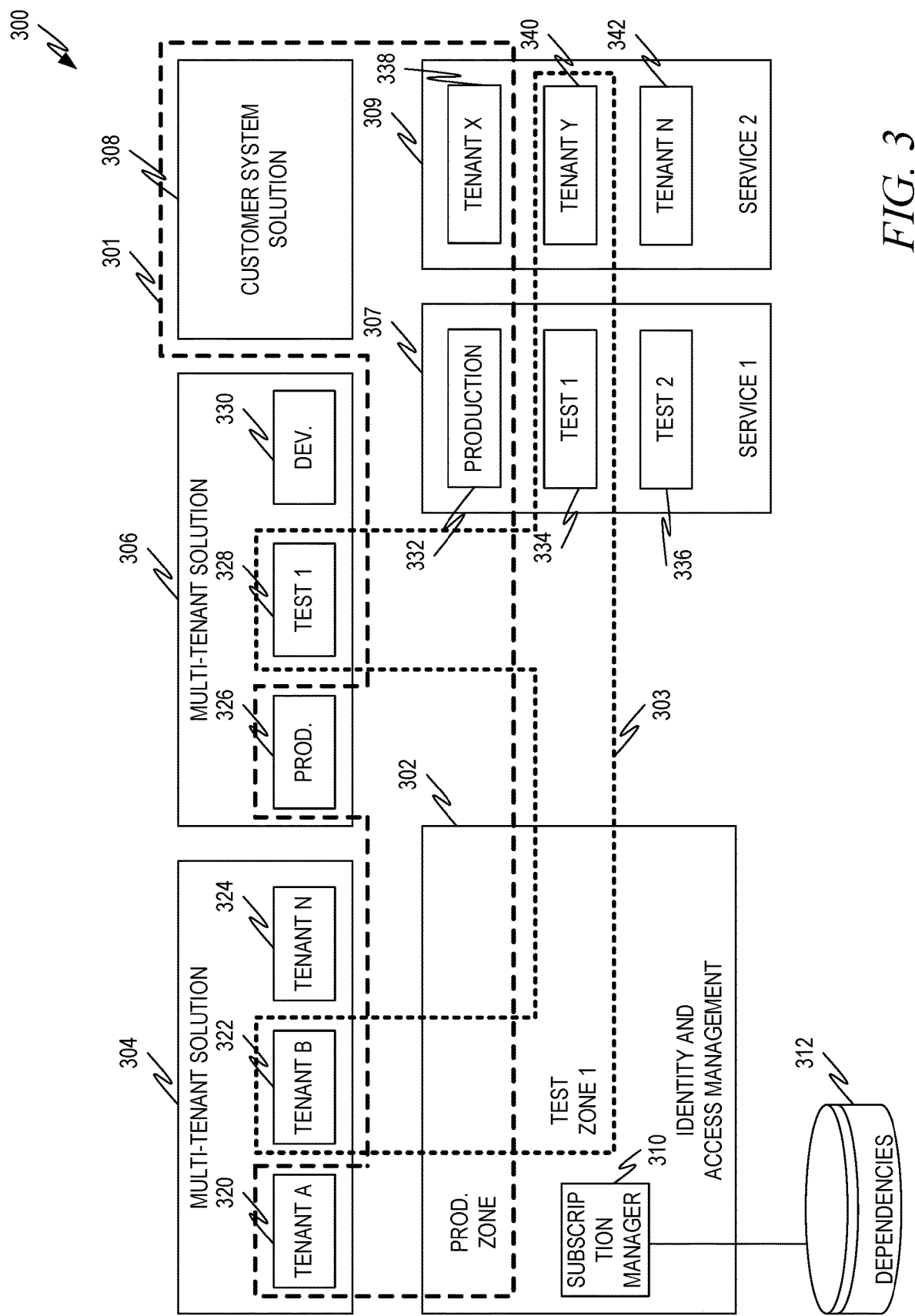
FIG. 3 is a diagram showing one example of an environment illustrating an implementation of zones in a cloud platform.

FIG. 3 is a diagram showing one example of an environment 300 illustrating an implementation of zones in a cloud platform. The environment 300 includes multi-tenant solutions 304, 306, multi-tenant services 307, 309, and a customer system solution 308. The multi-tenant solution 304 includes tenants 320, 322, 324. The multi-tenant solution 306 includes tenants 326, 328, 330. Similarly, the multi-tenant service 307 includes tenants 332, 334, 336 while the multi-tenant service 309 includes tenants 338, 340, 342. An identity and access management system 302 may operate in a manner similar to that of the identity and access management system 102 of FIGS. 1 and 2. FIG. 3 also shows a subscription manager system 310 along with a dependency data store 312. The subscription manager system 310, as described in more detail herein, manages and stores data relating tenants and customer system solutions that use and/or depend on one another.

The environment 300 of FIG. 3 shows two example zones 301, 303. The example zone 301, labeled a production zone includes tenant 320 of the solution 304, the tenant 328 of the solution 306, the tenant 332 of the service 307, the tenant 338 of the service 309, and the customer system solution 308. The zone 303, labeled a test zone, includes the tenant 322 of the solution 304, the tenant 328 of the solution 306, the tenant 334 of the service 307, and the tenant 340 of the service 309.

In this example, data units persisted for the components of the zone 301 may be accessible by other components of the zone 301. As a result, user identities and roles for the components of the zone 301 may also be shared in common. For example, a first user associated with a first role (and a corresponding scope or scopes) at the tenant 320 may be associated with the corresponding role and corresponding scope or scopes at the other components of the zone 301 including, for example, the tenant 326, the tenant 334, the tenant 340, and the customer system solution 308. Identities and roles may also be shared in common between the components of other zones, such as the zone 303 of FIG. 3.

Figure 4:
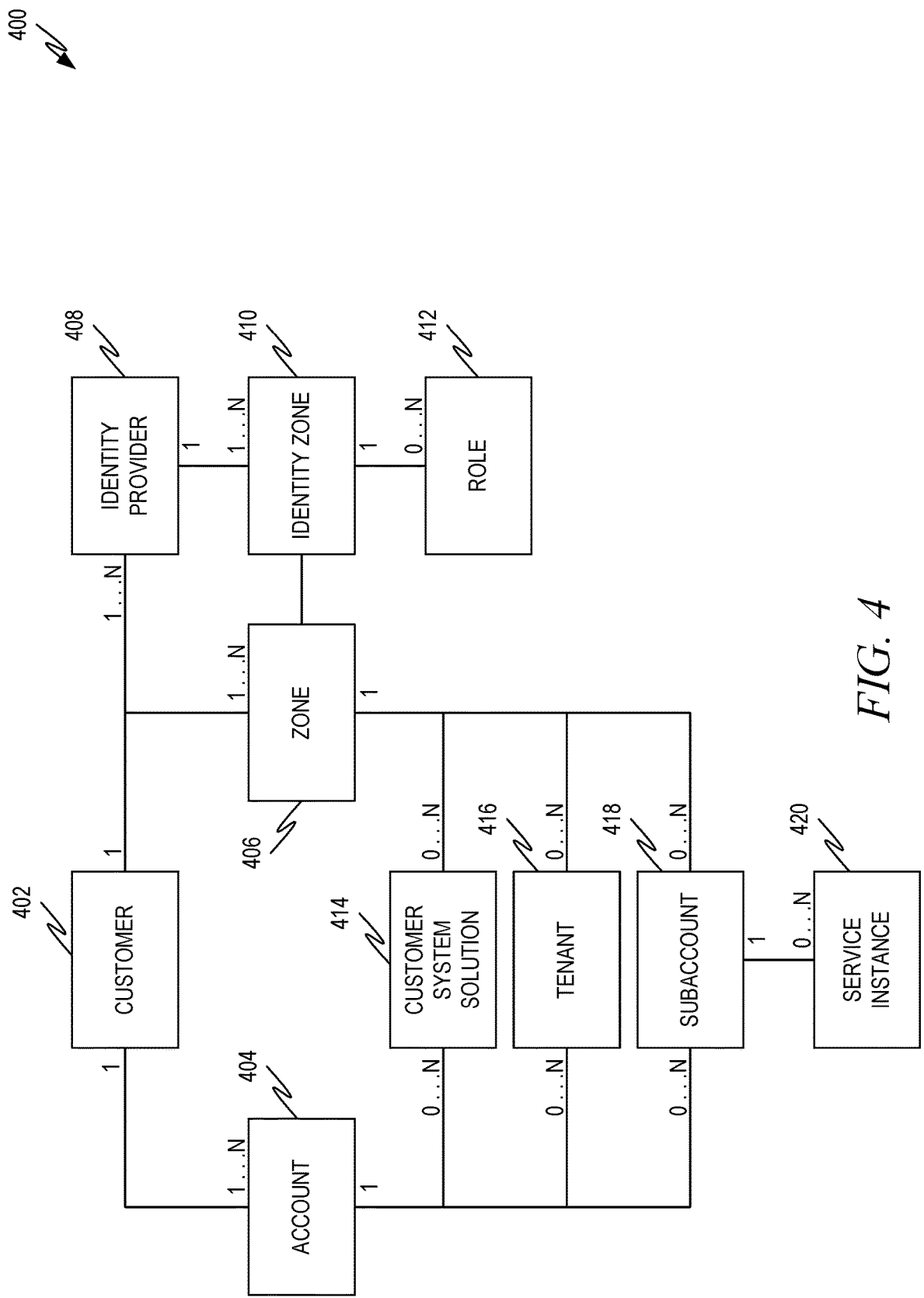
FIG. 4 is a diagram showing an example set of relationships between customer concepts in a cloud platform system implementing zones as described herein.

FIG. 4 is a diagram 400 showing an example set of relationships between customer concepts in a cloud platform system implementing zones as described herein. In FIG. 4, the customer 402 is a customer of a cloud platform, such as the cloud platform 101 of FIG. 1. The customer 402 can have one or more accounts 404. An account 404 is associated with a single customer 402 and describes an arrangement between the customer 402 and a cloud service provider that describes solutions provided to the customer 402 (e.g., users associated with the customer). The account 404 also defines metering or other billing metrics that describe how the customer 402 compensates the cloud services provided by the cloud platform.

An account may be associated with one or more customer system solutions 414, one or more tenants 416, and one or more subaccounts 418. Not every account 404 will be associated with a customer system solution 414, tenant 416, or subaccount 418. Customer system solutions 414 and tenants 416 are described in detail herein. The subaccount 418 is a sub-unit of an account 404 that is metered and billed distinctly. For example, charged associated with different subaccounts 418 of an account 404 may be billed separately and/or listed as separate line items on a common bill. The subaccount 418, in some examples, is associated with a given geographic region. For example, customer system solutions 414 and tenants 416 implemented by cloud platform deployments in a common geographic region may be metered and billed through a common subaccount.

In the example arrangement of FIG. 4, a subaccount 418 may be associated with one or more service instances 420. A service instance can include a service implemented as a customer system and/or a tenant at a multi-tenant service. For example, use of a service instance 420 may be metered and billed through its corresponding subaccount 418. In some examples, service instances 420 implemented for a customer in the same geographic region as a subaccount 418 may be associated with that subaccount 418.

The diagram 400 also shows that a customer 402 may be associated with one or more zones 406. A zone can be associated with one or more customer system solutions 414 and one or more tenants 416, as described herein. Additionally, a zone 406 may be associated with one or more subaccounts 418. As described herein, a subaccount 418, in various examples, is associated with cloud platform deployments at a given geographic region. Accordingly, in some examples, a zone 406 may be associated with subaccounts 418 across different geographic regions.

The customer 402 may also be associated with one or more identity providers 408. The identity provider 408 may operate in a manner similar to the identity provider system 104 described in conjunction with FIG. 1. The identity provider 408 may be referenced by one or more identity zones 410. An identity zone 410 is a container of links between a user and a scope or scopes at a zone 406. In some examples, an identity zone is associated with one or more roles 412. As described herein, a role is a collection of scopes at a zone 406 that are provided to users having similar characteristics (e.g., users who are part of the role).

Figure 5:
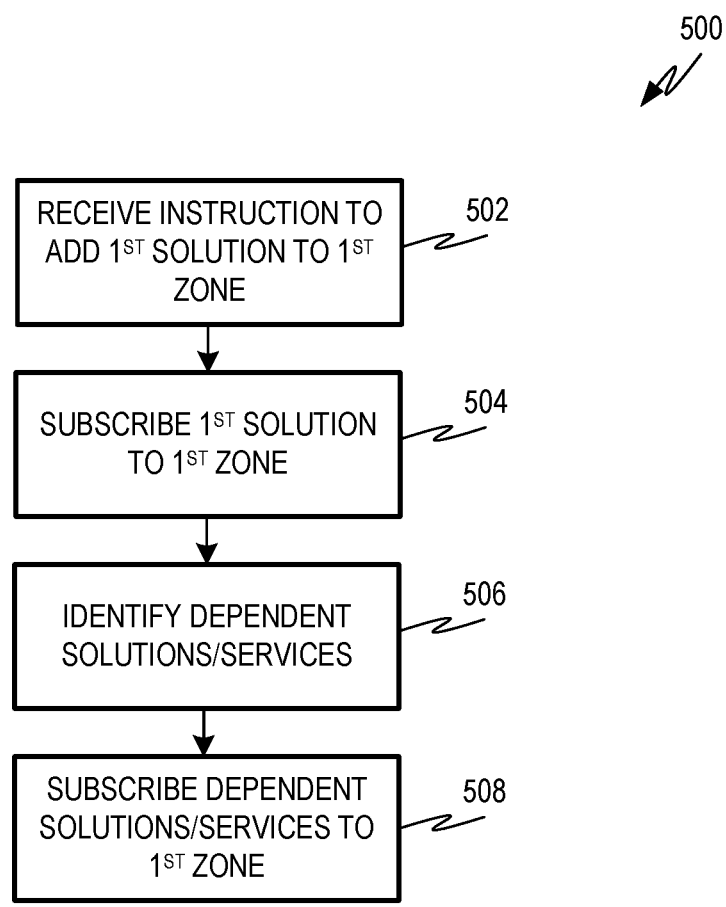
FIG. 5 is a flowchart showing one example of a process flow that may be executed in a cloud platform, such as the cloud platform of FIG. 1, to add a solution to a zone.

FIG. 5 is a flowchart showing one example of a process flow 500 that may be executed in a cloud platform, such as the cloud platform 101 of FIG. 1, to add a solution to a zone. At operation 502, the identity and access management system receives a request to add a first solution to a first zone. The request may originate from a customer, for example, an administrative user associated with the customer. The first solution to be added to the first zone may be a customer system solution that is dedicated to the customer and/or a multi-tenant solution. When the first solution is a multi-tenant solution, then the request to add the first solution to the zone may also identify a first tenant to be added to the zone.

At operation 504, the identity and access management system subscribes the first solution, or the first tenant thereof, to the first zone. In examples where the first solution is a customer system solution, the identity and access management system may subscribe the first solution to the zone at least in part by sending the first solution an indication of the zone ID of the first zone. In examples where the first solution is a multi-tenant solution, the identity and access management system may send the zone ID along with an indication of the first tenant to be added to the zone. The solution stores an association between the first tenant and the first zone. In addition to or instead, the solution may modify its data persistence for the first tenant to indicate the zone ID of the first zone or otherwise associated the data persistence of the first tenant to the zone ID.

At operation 506, the identity and access management system identifies solutions and/or services (if any) that are dependent on the first solution. The identity and access management system may identify solutions and/or services dependent on the first solution utilizing a subscription manager. The subscription manager, similar to the subscription manager system 310 of FIG. 3, maintains dependency data store 312 indicating dependencies between different solutions and services. The identity and access management may query the subscription manager to receive one or more dependencies of the first solution.

At operation 508, the identity and access management system subscribes dependent solutions and/or services (if any) to the first zone. If the dependent solution is a customer system solution, this can involve sending the zone ID to the customer system solution. In examples in which a dependent solution or service is multi-tenant, this can include identifying a tenant associated with the first solution (or tenant thereof) and sending the zone ID along with an indication of the appropriate tenant.

Figure 6:
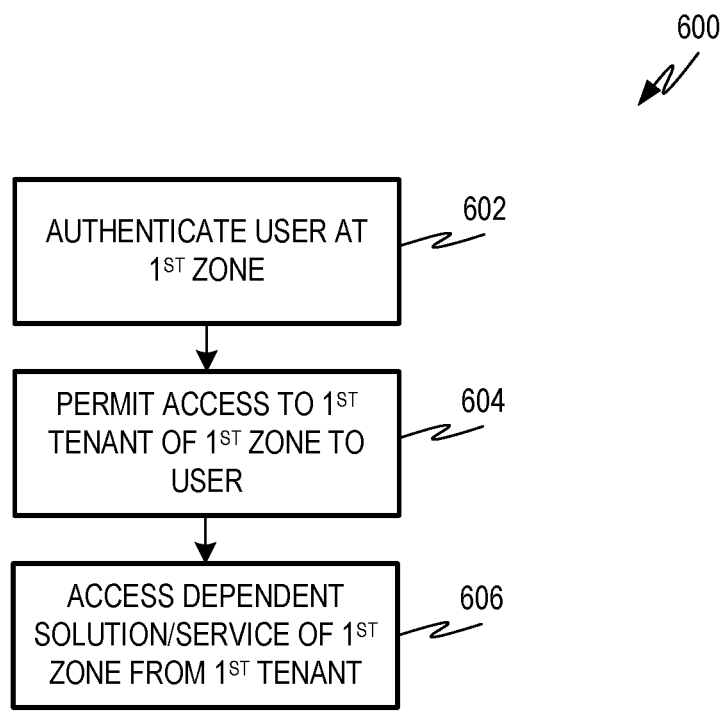
FIG. 6 is a flowchart showing one example of a process flow that may be executed in a cloud platform, such as the cloud platform of FIG. 1, to add a user with access to cloud platform solutions and/or services in a first zone.

FIG. 6 is a flowchart showing one example of a process flow 600 that may be executed in a cloud platform, such as the cloud platform 101 of FIG. 1, to provide a user with access to cloud platform solutions and/or services in a first zone.

At operation 602, the user authenticates to the cloud platform. This can be accomplished, for example, utilizing an identity provider and/or identity and access management system, as described herein with respect to FIG. 1. For example, the user may authenticate to an identity provider system that verifies the user's identity and, in some examples, correlates the user to a customer-defined group. The identity provider system may provide an identity token to the identity and access management system. The identity and access management system determines a first zone to which the user is authorized to log-on and a scope or scopes provided to the user in the first zone (if any). In some examples, the user indicates the first zone. Provided that the user is assigned one or more scopes at the first zone, the identity and access management system generates a zone token indicating a zone to which the user is to be logged-on. The zone token includes a zone ID for the zone and an indication of the identity of the user.

At operation 604, the cloud platform permits the user to access the first solution. For example, the user and/or identity and access management system may provide the first solution with a zone token indicating the zone ID of the zone to which the user has logged on. In examples in which the solution is a customer system solution that has been subscribed to the zone, the customer system solution may permit the user to access the solution and to use data persisted at the customer system solution. In examples in which the solution is a multi-tenant solution, the solution utilizes the zone ID to identify one or more tenants that are part of the first zone.

In permitting the user to access the first solution, the first solution may also permit the user to access persisted data that is in the zone. For example, the solution permits the user to access the identified tenants and their corresponding data persistence. For example, executing a solution task for the user may include determining a data unit at a data persistence that is associated with the zone ID of the first zone. This can include, for example, identifying a first data unit at the solution's persistence that is associated with the zone ID of the first zone and accessing that data unit.

At operation 606, the first solution accesses a dependent service and/or solution. For example, the first solution may provide the dependent service or solution with the zone ID indicating the first zone to which the user has logged-on. This may be achieved by forwarding the zone token to the dependent service or solution. The dependent service or solution may use the zone ID to identify a tenant that is associated with the first zone. The dependent service or solution then provides the first solution with access to the tenant including, for example, access to data persisted by or for the tenant.

Figure 7:
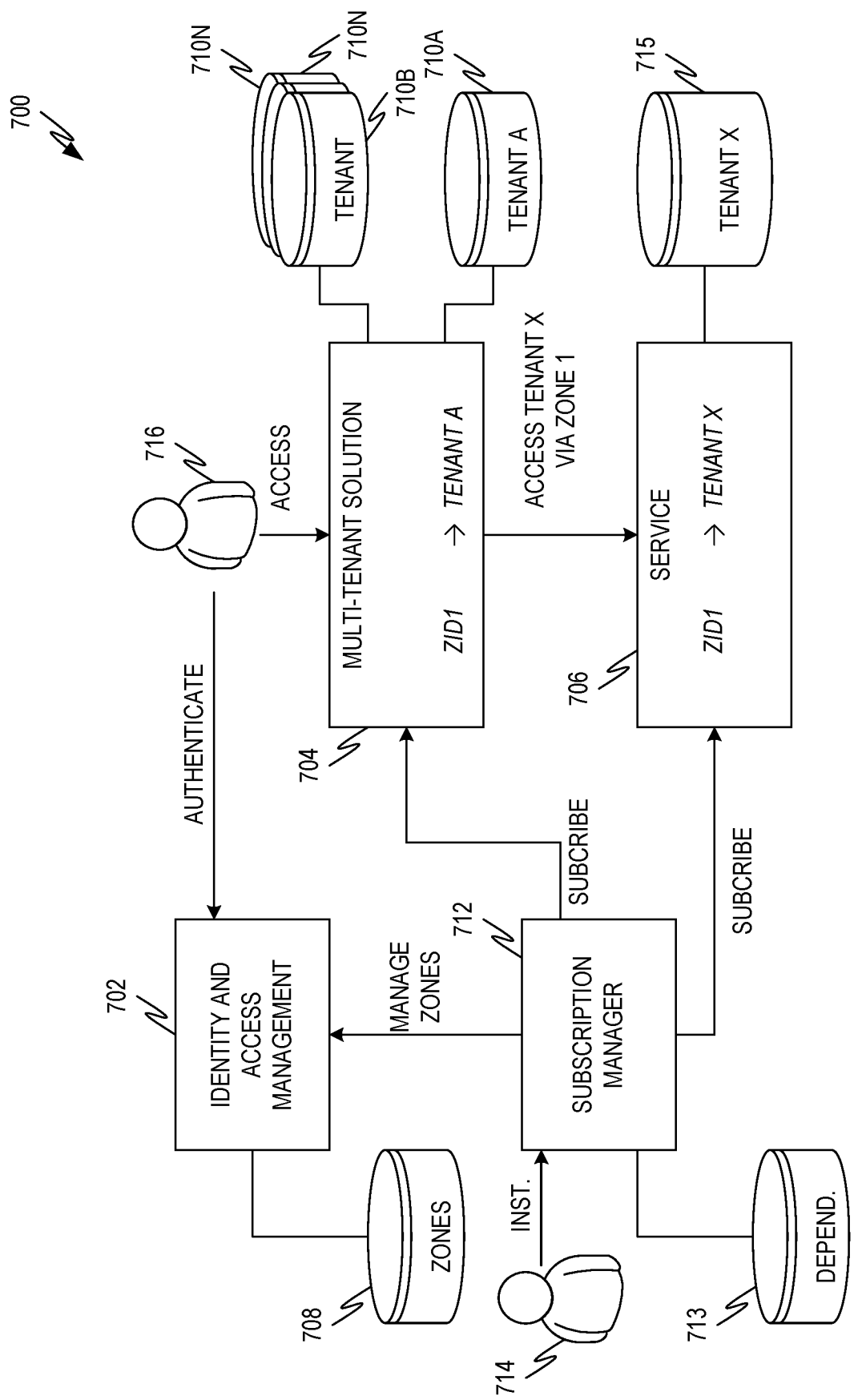
FIG. 7 is a workflow diagram illustrating example implementations of the process flows of FIGS. 5 and 6.

FIG. 7 is a workflow diagram 700 illustrating adding a solution to a zone and providing a user with access to the solution. The diagram 700 includes an example identity and access management system 702, a subscription manager 712, a multi-tenant solution 704, and a multi-tenant service 706 that is dependent on the solution 704. The identity and access management system 702 maintains a data store 708 that persists data describing zones in a cloud platform system. The subscription manager 712 maintains a dependency data store 713 indicating dependencies between solutions and/or services at the cloud platform system. The multi-tenant solution 704 includes databases 710A, 710B, 710N associated with different tenants of the solution 704 including a database 710A that is associated with a tenant of the solution 704 labeled Tenant A. Similarly, the service 706 includes at least one database 715 that is associated with a tenant of the service 706 labeled Tenant X.

In FIG. 7, an administrative user 714 provides to the subscription manager an instruction to add the Tenant A of the solution 704 to a first zone, having a zone ID ZID1. The subscription manager, in response, subscribes the solution 704 to the first zone. In response, the solution 704 stores an association between the zone ID ZID1 and Tenant A, as shown. Also, in some examples, the solution 704 modifies the database 710A associated with Tenant A to include a reference to the zone ID ZID1.

Also, in FIG. 7, a user 716 authenticates to the identity and access management system 702. For example, the user 716 may utilize an identity provided as described herein. The identity and access management system 702 may provide a zone token to the user 716 for provision to the solution 704 and/or directly to the solution 704. The user 716 accesses the solution 704, as shown. The solution 704 is aware that the user 716 is logged-on to the first zone, for example, because the solution 704 has received the zone ID ZID1 either from the user 716 and/or from the identity and access management system 702. Accordingly, the solution 704 provides the user 716 with access to Tenant A.

In the course of its execution, the solution 704 accesses the service 706. For example, the solution 704 may send an access request including the zone ID ZID1 that is associated with the first zone. In response, the service 706 may provide the solution 704 with access to Tenant X at the service 706, which is associated with the first zone and its zone ID ZID1.

Figure 8:
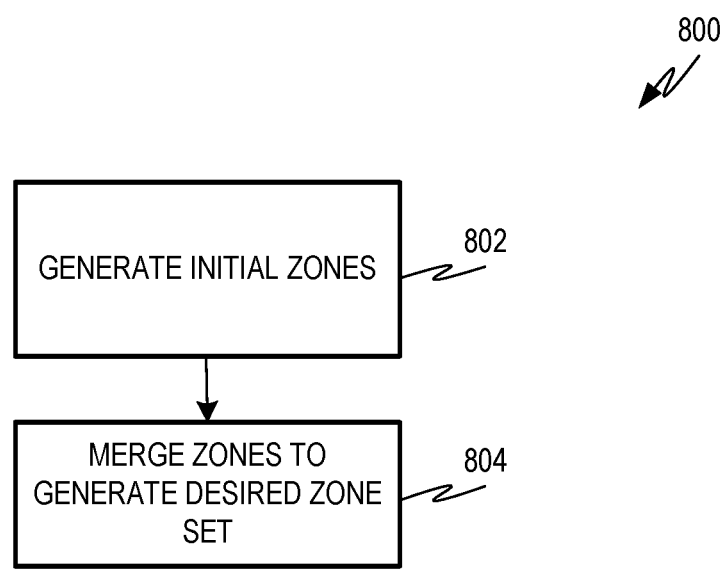
FIG. 8 is a flow chart showing one example of a process flow for adding zones to a cloud platform system.
Figure 9:
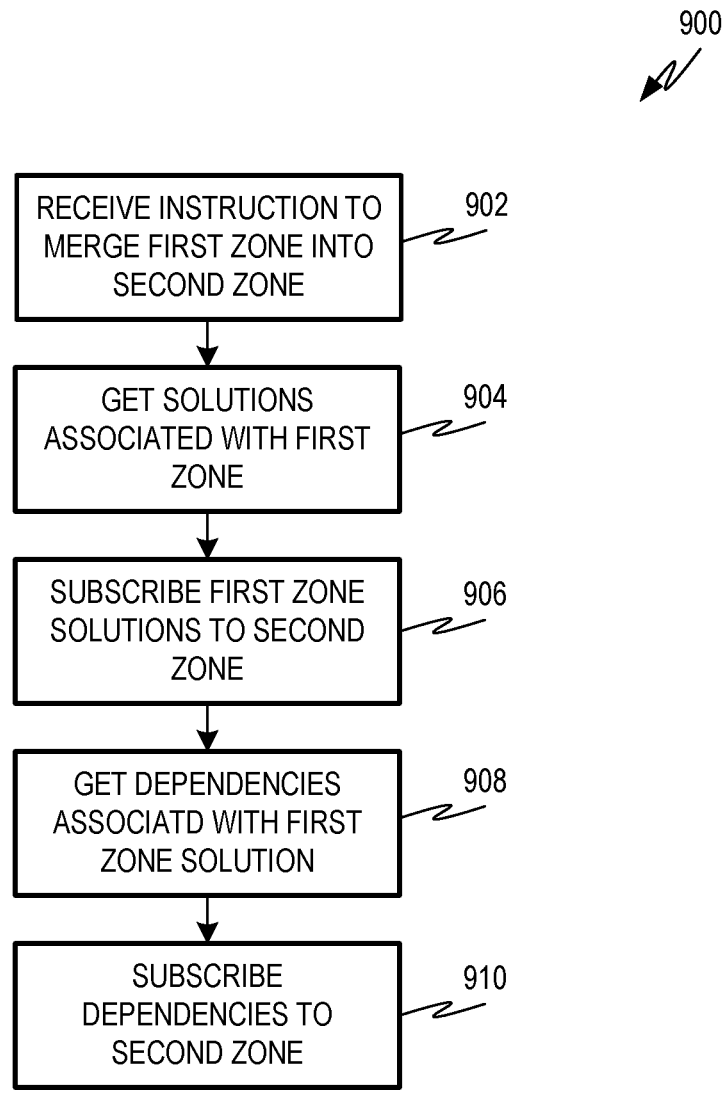
FIG. 9 is a flowchart showing one example of a process flow that can be implemented in a cloud platform to merge a first zone and a second zone.
Figure 10:
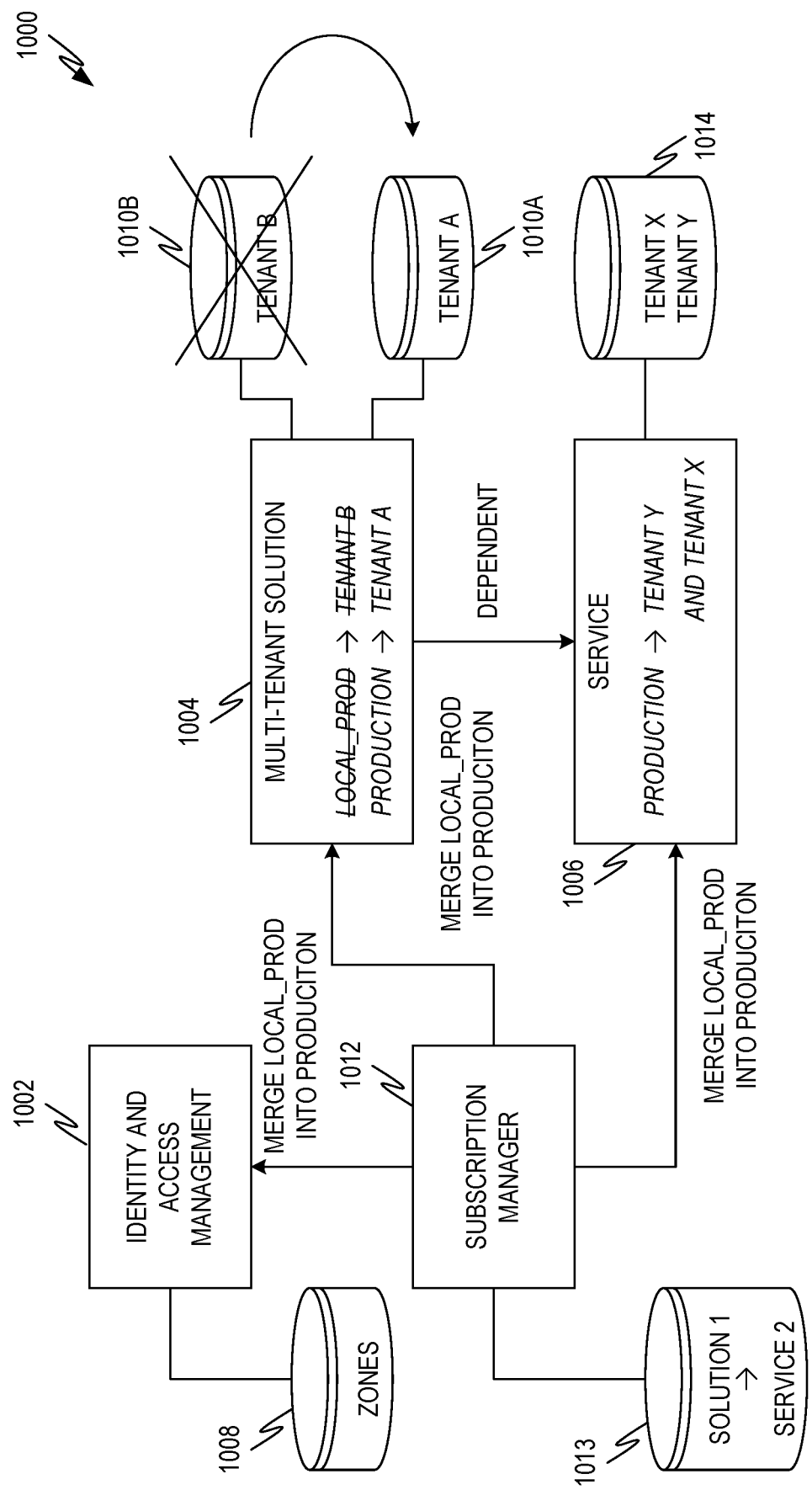
FIG. 10 is a workflow diagram illustrating example implementations of the process flow of FIG. 9.

In some examples, it is desirable to add zones to a cloud platform system that did not previously have zones. FIGS. 8-10 demonstrate an example way to make such a transition. FIG. 8 is a flow chart showing one example of a process flow 800 for adding zones to a cloud platform system. The process flow 800 may be performed in a cloud platform such as, for example, by an identity and access management system and/or a subscription manager. In some examples, the process flow 800 is performed on a customer-by-customer basis. For example, the process flow 800 may be performed once for each customer that transitions to zones. At operation 802, the cloud platform generates initial zones. For the initial zones, each solution (or tenant thereof) is placed in a distinct zone. For example, each customer system solution is placed in a distinct zone. For multi-tenant solutions, each tenant is placed in a distinct zone. Placing a solution and/or tenant in a zone can include, for example, determining dependent solutions and/or tenants and also subscribing those solutions and/or tenants to the same zone, for example, as described herein.

At operation 804, the cloud platform merges some or all of the initial zones to generate a desired set of zones for the cloud platform. For example, the customer may provide an indication of which solutions or tenants thereof are to be in a common zone. From this, the cloud platform may derive a set of mergers between zones and execute the mergers to generate a set of zones matching the customer's request.

FIG. 9 is a flowchart showing one example of a process flow 900 that can be implemented in a cloud platform to merge a first zone and a second zone. The process flow 900 can be implemented in a cloud platform, for example, by an identity and access management system and/or by a subscription manager.

At operation 902, the cloud platform receives an instruction to merge a first zone into a second zone. The instruction may be received from a customer (e.g., by an administrative user of the customer). At operation 904, the cloud platform identifies solutions that are associated with the first zone. Data relating solutions (or tenants thereof) to zones may be stored, for example, at a zone data store associated with an identity and access management system. At operation 906, the cloud platform subscribes the first zone solutions identified at operation 904 to the second zone. At operation 908, the cloud platform identifies solutions and/or services that are dependent on the solutions identified at operation 904. These solutions and/or services are also subscribed to the second zone at operation 910.

FIG. 10 is a workflow diagram 1000 illustrating example implementations of the process flow 900 of FIG. 9. The diagram 1000 includes an example identity and access management system 1002, a subscription manager 1012, a multi-tenant solution 1004, and a multi-tenant service 1006 that is dependent on the solution 1004. The identity and access management system 1002 maintains a data store 1008 that persists data describing zones and associated solutions. The subscription manager 1012 maintains a dependency data store 1013 indicating dependencies between solutions and/or services at the cloud platform system.

The multi-tenant solution 1004 initially implements two tenants, Tenant A and Tenant B, where Tenant A persists data at a database 1010A and Tenant B persists data at a database 1010B. The multi-tenant service 1006 initially includes two tenants labeled Tenant X and Tenant Y. The multi-tenant service 1006 utilizes a common database 1014 for Tenant X and Tenant Y. For example, the database 1014 may include separate schemas for the Tenant X and the Tenant Y and/or common tables having a tenant or zone ID column, as described herein.

In the example of FIG. 10, the subscription manager 1012 implements a merger of a first zone labeled Local_Prod into a second zone labeled Production. The subscription manager 1012, for example, may have received an instruction from a customer associated with the Production and Local_Prod zones to execute the merger. As shown, the subscription manager 1012 sends to the identity and access management system 1002 a request to merge the two zones. The identity and access management system 1002 may respond by updating its zone data store 1008 to associate services, solutions, and/or tenants that were previously associated with the zone Local_Prod with the zone Production. In some examples, the identity and access management system 1002 provides the subscription manager 1012 with an indication of services and/or solutions that were previously associated with the zone Local_Prod, including the Tenant B of the solution 1004.

The subscription manager 1012 may instruct the solution 1004 to merge the Local_Prod zone into the Production zone. In the example of FIG. 10, the solution 1004 responds by merging Tenant B into Tenant A, resulting in one Tenant A that belongs to the Production zone. In this example, the solution 1004 moves data from the database 1010B previously associated with Tenant B to the database 1010A associated with Tenant A. The solution 1004 also deletes any stored associations between Tenant A and the Local_Prod zone.

The subscription manager 1012 also determines solutions and/or services that depend on solution 1004. In this example, the subscription manager 1012 identifies the multi-tenant service 1006 as depending from solution 1004. Accordingly, the subscription manager 1012 instructs the multi-tenant service 1006 to merge the Local_Prod zone with the Production zone. The multi-tenant service 1006, in this example, does not merge Tenant X and Tenant Y but, instead, as shown, associates both Tenant X and Tenant Y with the Production zone. It will be appreciated that either arrangement (e.g., merging of zones or associating multiple tenants with a single zone) can be performed for either services or solutions, depending on the implementation.

EXAMPLES

Example 1 is a method of managing a cloud platform for implementing a plurality of cloud components, the method comprising: receiving, by a first cloud component, a zone token, wherein the zone token comprises a first user identifier indicating a first user and a first zone identifier (ID) indicating a first zone; receiving, by the first cloud component and from a user computing system associated with the zone token, a task request indicating a first task; executing the first task by the first cloud component, wherein executing the first task comprises: determining a first data unit at the first cloud component associated with the first zone ID; accessing the first data unit; and sending a request message to a second cloud component, the request message comprising the first zone ID, wherein the second cloud component comprises at least one data unit associated with the first zone ID.

In Example 2, the subject matter of Example 1 optionally includes before receiving the task request, receiving, by the first cloud component and from an identity and access management system of the cloud platform, a request to add a first tenant of the first cloud component to the first zone, the request comprising the first zone ID; and responsive to the request to add the first tenant to the first zone, associating at least one data unit of the first tenant to reference the first zone ID of the first zone, the at least one data unit of the first tenant comprising the first data unit.

In Example 3, the subject matter of Example 2 optionally includes determining that a second tenant at the second cloud component depends on the first tenant; and sending, to the second cloud component, a request to add the second tenant to the first zone, the request comprising the first zone ID.

In Example 4, the subject matter of any one or more of Examples 1-3 optionally includes sending the zone token to the first cloud component; determining a second cloud component that is associated with the first zone; and sending the zone token to the second cloud component.

In Example 5, the subject matter of any one or more of Examples 1-4 optionally includes wherein a first tenant at the first cloud component is assigned to a third zone and a second tenant at the first cloud component is assigned to the first zone, further comprising: receiving, by the first cloud component, a request to merge the first zone and the third zone; identifying, by the first cloud component, a set of data units associated with a third zone ID; and associating, by the first cloud component, the set of data units with the first zone ID.

In Example 6, the subject matter of Example 5 optionally includes wherein associating the set of data units with the first zone ID comprises erasing the set of data units from a first database and writing the set of data units to a second database associated with the first zone.

In Example 7, the subject matter of any one or more of Examples 5-6 optionally includes wherein associating the set of data units with the first zone ID comprises erasing the set of data units from a first database schema and writing the set of data units to a second database schema associated with the first zone.

In Example 8, the subject matter of any one or more of Examples 5-7 optionally includes wherein associating the set of data units with the first zone ID comprises modifying a first record of a first data unit of the set of data units to include the first zone ID.

Example 9 is a cloud platform system for implementing a plurality of cloud components, the cloud platform system comprising: at least one computing device comprising a memory and a processor, wherein the at least one computing device is programmed to perform operations comprising: receiving, by a first cloud component, a zone token, wherein the zone token comprises a first user identifier indicating a first user and a first zone identifier (ID) indicating a first zone; receiving, by the first cloud component and from a user computing system associated with the zone token, a task request indicating a first task; executing the first task by the first cloud component, wherein executing the first task comprises: determining a first data unit at the first cloud component associated with the first zone ID; accessing the first data unit; and sending a request message to a second cloud component, the request message comprising the first zone ID, wherein the second cloud component comprises at least one data unit associated with the first zone ID.

In Example 10, the subject matter of Example 9 optionally includes the operations further comprising: before receiving the task request, receiving, by the first cloud component and from an identity and access management system of the cloud platform, a request to add a first tenant of the first cloud component to the first zone, the request comprising the first zone ID; and responsive to the request to add the first tenant to the first zone, associating at least one data unit of the first tenant to reference the first zone ID of the first zone, the at least one data unit of the first tenant comprising the first data unit.

In Example 11, the subject matter of Example 10 optionally includes the operations further comprising: determining that a second tenant at the second cloud component depends on the first tenant; and sending, to the second cloud component, a request to add the second tenant to the first zone, the request comprising the first zone ID.

In Example 12, the subject matter of any one or more of Examples 9-11 optionally includes the operations further comprising: sending the zone token to the first cloud component; determining a second cloud component that is associated with the first zone; and sending the zone token to the second cloud component.

In Example 13, the subject matter of any one or more of Examples 9-12 optionally includes wherein a first tenant at the first cloud component is assigned to a third zone and a second tenant at the first cloud component is assigned to the first zone, the operations further comprising: receiving, by the first cloud component, a request to merge the first zone and the third zone; identifying, by the first cloud component, a set of data units associated with a third zone ID; and associating, by the first cloud component, the set of data units with the first zone ID.

In Example 14, the subject matter of Example 13 optionally includes wherein associating the set of data units with the first zone ID comprises erasing the set of data units from a first database and writing the set of data units to a second database associated with the first zone.

In Example 15, the subject matter of any one or more of Examples 13-14 optionally includes wherein associating the set of data units with the first zone ID comprises erasing the set of data units from a first database schema and writing the set of data units to a second database schema associated with the first zone.

In Example 16, the subject matter of any one or more of Examples 13-15 optionally includes wherein associating the set of data units with the first zone ID comprises modifying a first record of a first data unit of the set of data units to include the first zone ID.

Example 17 is a non-transitory machine-readable medium comprising instructions thereon that, when executed by at least one processor, cause the at least one processor to perform operations comprising: receiving, by a first cloud component, a zone token, wherein the zone token comprises a first user identifier indicating a first user and a first zone identifier (ID) indicating a first zone; receiving, by the first cloud component and from a user computing system associated with the zone token, a task request indicating a first task; executing the first task by the first cloud component, wherein executing the first task comprises: determining a first data unit at the first cloud component associated with the first zone ID; accessing the first data unit; and sending a request message to a second cloud component, the request message comprising the first zone ID, wherein the second cloud component comprises at least one data unit associated with the first zone ID.

In Example 18, the subject matter of Example 17 optionally includes the operations further comprising: before receiving the task request, receiving, by the first cloud component and from an identity and access management system of the cloud platform, a request to add a first tenant of the first cloud component to the first zone, the request comprising the first zone ID; and responsive to the request to add the first tenant to the first zone, associating at least one data unit of the first tenant to reference the first zone ID of the first zone, the at least one data unit of the first tenant comprising the first data unit.

In Example 19, the subject matter of Example 18 optionally includes the operations further comprising: determining that a second tenant at the second cloud component depends on the first tenant; and sending, to the second cloud component, a request to add the second tenant to the first zone, the request comprising the first zone ID.

In Example 20, the subject matter of any one or more of Examples 17-19 optionally includes the operations further comprising: sending the zone token to the first cloud component; determining a second cloud component that is associated with the first zone; and sending the zone token to the second cloud component.

Figure 11:
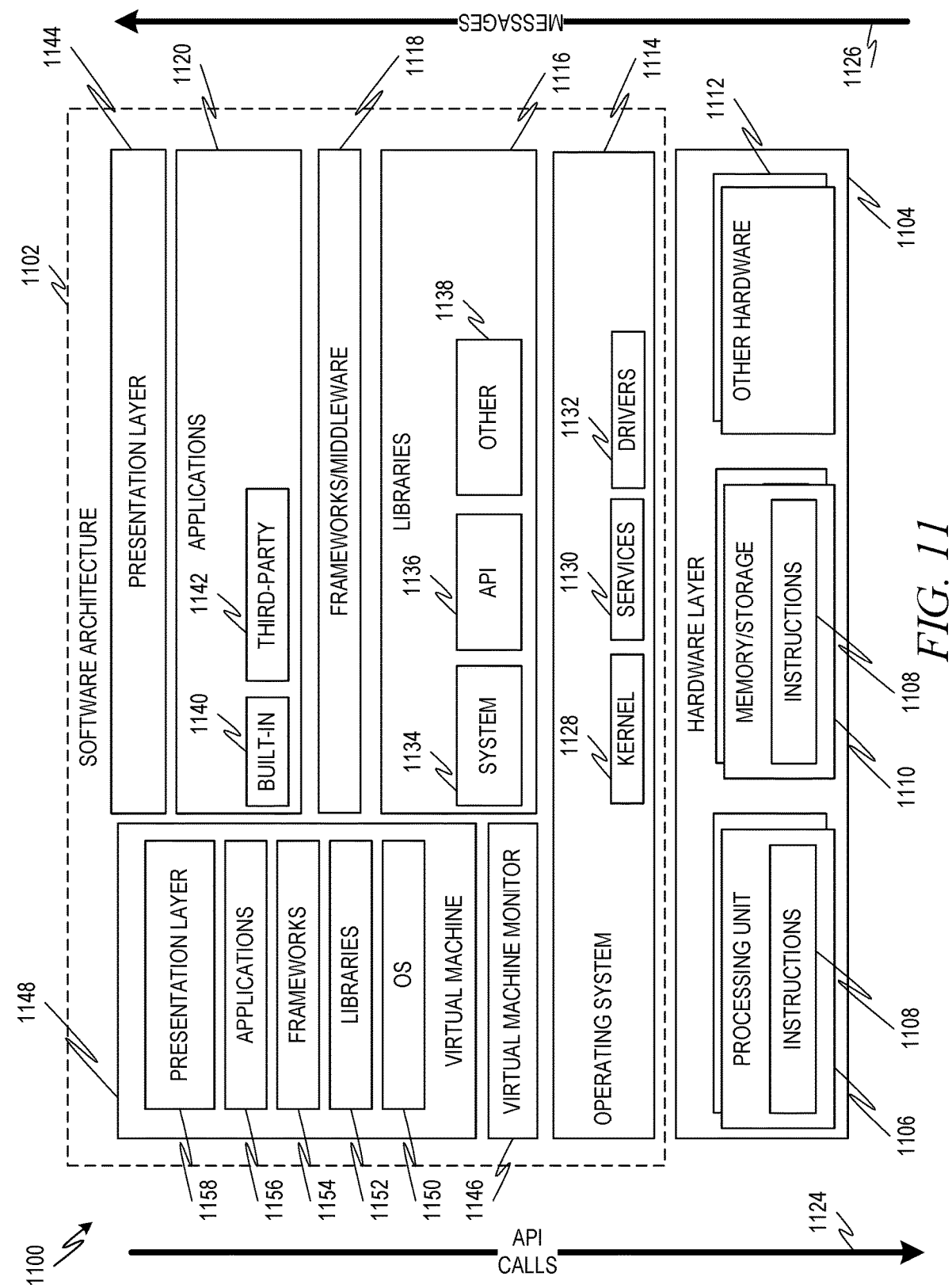
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 12:
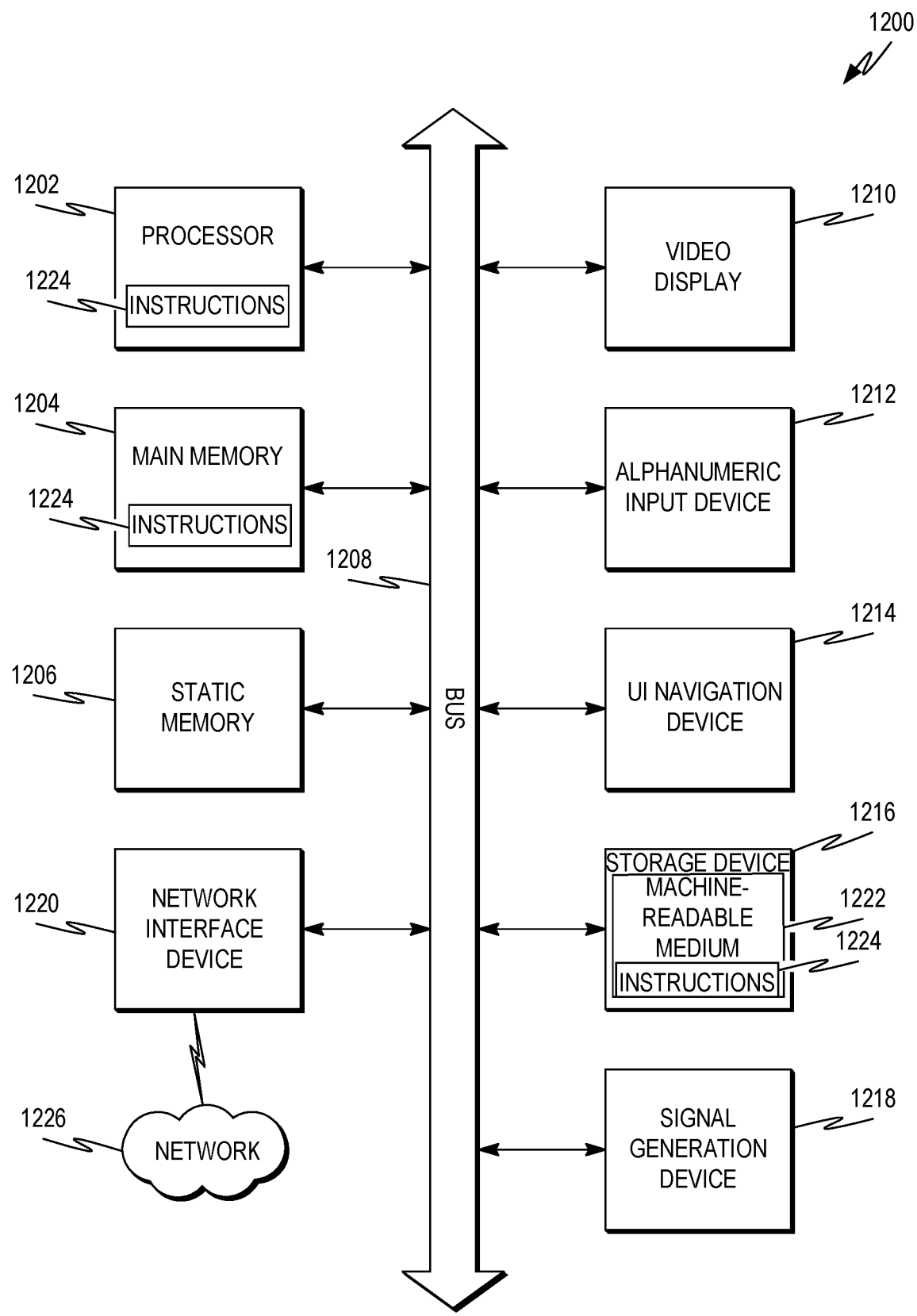
FIG. 12 is a block diagram of a machine in the example form of a computing system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation (or cursor control) device 1214 (e.g., a mouse), a disk drive unit 1216, a signal generation device 1218 (e.g., a speaker), and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of managing a cloud platform for implementing a plurality of cloud components, the method comprising:

receiving, by a first cloud component executing at a first cloud platform deployment in a first geographic area, a zone token, wherein the zone token comprises a first user identifier indicating a first user and a first zone identifier (ID) indicating a first zone of a first tenant of the first cloud component, the first cloud component comprising a first persistence for the first tenant;

receiving, by the first cloud component and from a user computing system associated with the zone token, a task request indicating a first task;

executing the first task by the first cloud component, wherein executing the first task comprises:

accessing a first data unit from the first persistence, the first data unit being associated with the first zone ID at the first persistence; and sending a request message to a second cloud component executing at a second cloud platform deployment in a second geographic area different than the first geographic area, the second cloud component comprising a second persistence separate from the first persistence and associated with a second tenant of the second cloud component, the request message comprising the first zone ID and a description of a subtask of the first task; and executing the subtask by the second cloud component at least in part by accessing a second data unit from the second persistence, the second data unit being associated with the first zone ID at the second persistence.

2. The method of claim 1, further comprising:

before receiving the task request, receiving, by the first cloud component and from an identity and access management system of the cloud platform, a request to add a first tenant of the first cloud component to the first zone, the request comprising the first zone ID; and responsive to the request to add the first tenant to the first zone, associating at least one data unit of the first tenant to reference the first zone ID of the first zone, the at least one data unit of the first tenant comprising the first data unit.

3. The method of claim 2, further comprising:

determining that a second tenant at the second cloud component depends on the first tenant; and sending, to the second cloud component, a request to add the second tenant to the first zone, the request comprising the first zone ID.

4. The method of claim 1, further comprising:

sending the zone token to the first cloud component;

determining a second cloud component that is associated with the first zone; and sending the zone token to the second cloud component.

5. The method of claim 1, wherein a first tenant at the first cloud component is assigned to a third zone and a second tenant at the first cloud component is assigned to the first zone, further comprising:

receiving, by the first cloud component, a request to merge the first zone and the third zone;

identifying, by the first cloud component, a set of data units associated with a third zone ID; and associating, by the first cloud component, the set of data units with the first zone ID.

6. The method of claim 5, wherein associating the set of data units with the first zone ID comprises erasing the set of data units from a first database and writing the set of data units to a second database associated with the first zone.

7. The method of claim 5, wherein associating the set of data units with the first zone ID comprises erasing the set of data units from a first database schema and writing the set of data units to a second database schema associated with the first zone.

8. The method of claim 5, wherein associating the set of data units with the first zone ID comprises modifying a first record of a first data unit of the set of data units to include the first zone ID.

9. A cloud platform system for implementing a plurality of cloud components, the cloud platform system comprising:

at least one computing device comprising a memory and a processor, wherein the at least one computing device is programmed to perform operations comprising:

receiving, by a first cloud component executing at a first cloud platform deployment in a first geographic area, a zone token, wherein the zone token comprises a first user identifier indicating a first user and a first zone identifier (ID) indicating a first zone of a first tenant of the first cloud component, the first cloud component comprising a first persistence for the first tenant;

receiving, by the first cloud component and from a user computing system associated with the zone token, a task request indicating a first task;

executing the first task by the first cloud component, wherein executing the first task comprises:

accessing a first data unit from the first persistence, the first data unit being associated with the first zone ID at the first persistence; and sending a request message to a second cloud component executing at a second cloud platform deployment in a second geographic area different than the first geographic area, the second cloud component comprising a second persistence separate from the first persistence, the request message comprising the first zone ID and a description of a subtask of the first task; and executing the subtask by the second cloud component at least in part by accessing a second data unit from the second persistence of the second cloud component, the second data unit being associated with the first zone ID at the second persistence.

10. The system of claim 9, the operations further comprising:

before receiving the task request, receiving, by the first cloud component and from an identity and access management system of the cloud platform, a request to add a first tenant of the first cloud component to the first zone, the request comprising the first zone ID; and responsive to the request to add the first tenant to the first zone, associating at least one data unit of the first tenant to reference the first zone ID of the first zone, the at least one data unit of the first tenant comprising the first data unit.

11. The system of claim 10, the operations further comprising:

determining that a second tenant at the second cloud component depends on the first tenant; and sending, to the second cloud component, a request to add the second tenant to the first zone, the request comprising the first zone ID.

12. The system of claim 9, the operations further comprising:

sending the zone token to the first cloud component;

determining a second cloud component that is associated with the first zone; and sending the zone token to the second cloud component.

13. The system of claim 9, wherein a first tenant at the first cloud component is assigned to a third zone and a second tenant at the first cloud component is assigned to the first zone, the operations further comprising:

receiving, by the first cloud component, a request to merge the first zone and the third zone;

identifying, by the first cloud component, a set of data units associated with a third zone ID; and associating, by the first cloud component, the set of data units with the first zone ID.

14. The system of claim 13, wherein associating the set of data units with the first zone ID comprises erasing the set of data units from a first database and writing the set of data units to a second database associated with the first zone.

15. The system of claim 13, wherein associating the set of data units with the first zone ID comprises erasing the set of data units from a first database schema and writing the set of data units to a second database schema associated with the first zone.

16. The system of claim 13, wherein associating the set of data units with the first zone ID comprises modifying a first record of a first data unit of the set of data units to include the first zone ID.

17. A non-transitory machine-readable medium comprising instructions thereon that, when executed by at least one processor, cause the at least one processor to perform operations comprising:

receiving, by a first cloud component executing at a first cloud platform deployment in a first geographic area, a zone token, wherein the zone token comprises a first user identifier indicating a first user and a first zone identifier (ID) indicating a first zone of a first tenant of the first cloud component, the first cloud component comprising a first persistence for the first tenant;

receiving, by the first cloud component and from a user computing system associated with the zone token, a task request indicating a first task;

executing the first task by the first cloud component comprising a first persistence, wherein executing the first task comprises:

accessing a first data unit from the first persistence of the first cloud component, the first data unit being associated with the first zone ID at the first persistence; and sending a request message to a second cloud component executing at a second cloud platform deployment in a second geographic area different than the first geographic area, the second cloud component comprising a second persistence separate from the first persistence and associated with a second tenant of the second cloud component, the request message comprising the first zone ID and a description of a subtask of the first task; and executing the subtask by the second cloud component at least in part by accessing a second data unit from the second persistence of the second cloud component, the second data unit being associated with the first zone ID at the second persistence.

18. The medium of claim 17, the operations further comprising:

before receiving the task request, receiving, by the first cloud component and from an identity and access management system, a request to add a first tenant of the first cloud component to the first zone, the request comprising the first zone ID; and responsive to the request to add the first tenant to the first zone, associating at least one data unit of the first tenant to reference the first zone ID of the first zone, the at least one data unit of the first tenant comprising the first data unit.

19. The medium of claim 18, the operations further comprising:

determining that a second tenant at the second cloud component depends on the first tenant; and sending, to the second cloud component, a request to add the second tenant to the first zone, the request comprising the first zone ID.

20. The medium of claim 17, the operations further comprising:

sending the zone token to the first cloud component;

determining a second cloud component that is associated with the first zone; and sending the zone token to the second cloud component.

\* \* \* \* \*